March 17, 1931. A. WEAVER 1,796,497
RECTIFYING ARRANGEMENT
Filed April 18, 1929

INVENTOR
A. Weaver
BY
ATTORNEY

Patented Mar. 17, 1931

1,796,497

UNITED STATES PATENT OFFICE

ALLAN WEAVER, OF BROOKLYN, NEW YORK, ASSIGNOR TO AMERICAN TELEPHONE AND TELEGRAPH COMPANY, A CORPORATION OF NEW YORK

RECTIFYING ARRANGEMENT

Application filed April 18, 1929. Serial No. 356,247.

This invention relates to rectifying apparatus and more particularly to improvements in the circuit arrangements for connecting such apparatus to a load under open-and-close operating conditions.

One of the uses to which the arrangements of the invention might be put would be in supplying operating current for telegraph printers under the open-and-close condition caused by the operation of a line relay. Accordingly, the invention will be described as associated with telegraph circuit arrangements for purposes of illustration. However, the rectifier circuits of the invention are adapted to many other uses. Accordingly, the rectifier circuit arrangements may be used to replace the motor generator sets which are now used to supply direct current to telegraph printers when they are located at a place where the power supply is alternating current. In previous attempts to design a rectifier for this purpose, one of the principal difficulties appeared to be poor regulation when the rectifier was operating on an open-and-close load due to the operation of the line relay. For example, when the load was off, the voltage at the terminals of the rectifier would go up to the peak value of the alternating voltage, and when the load was on, the voltage would be normal. It has also been found, that when operating under the open-and-close condition, the wave shape delivered to the load would be poor due to the high time constant of the filter usually associated with the rectifier. —

The above difficulties in the design of rectifier circuits are overcome in the arrangements of this invention by placing a load on the back contact of the line relay equal to the load on the front contact. Under this condition, the current delivered by the rectifier is constant under all conditions except during the travel time of the relay armature and the time constant of the filter associated therewith is high enough to hold the current nearly constant during this period. When the rectifier arrangements of this invention are utilized in connection with a telegraph line relay, the current will be sufficiently constant so that the biasing winding of such relay may be placed in series in the rectifier output. Other features and advantages of the arrangements of the invention will appear more fully from the detailed description thereof hereinafter given.

Figure 1:
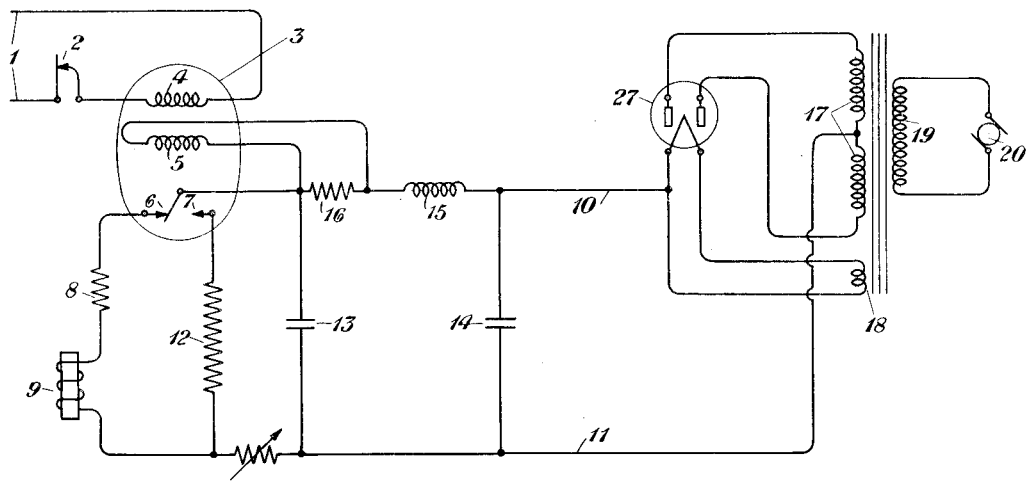
Figure 2:
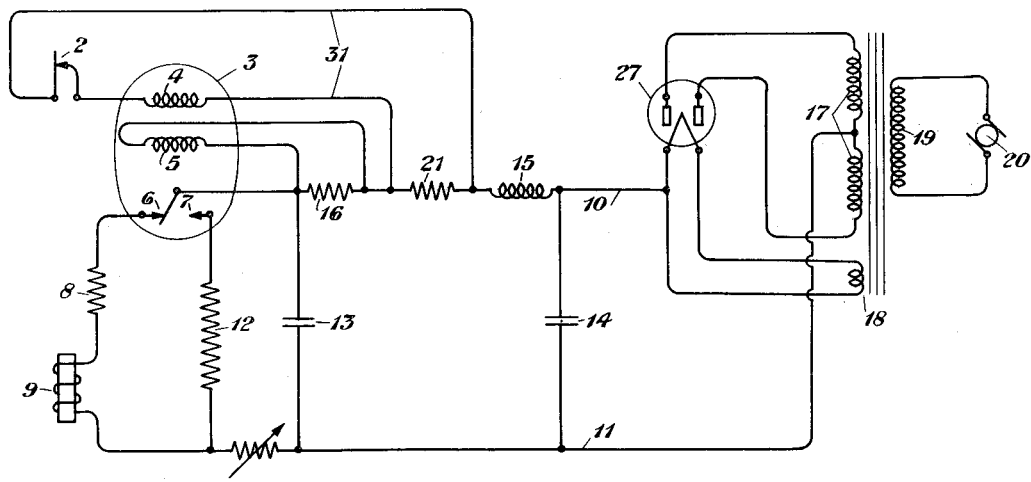

The invention may be more fully understood from the following description together with the accompanying drawing in the Figures 1 and 2 of which the invention is illustrated. Fig. 1 is a circuit diagram showing a preferred form of the invention. Fig. 2 is a modification thereof. Similar reference characters have been utilized to denote like parts in all of the figures.

In Fig. 1 is shown a section 1 of a telegraph line. In this are included the sending contacts 2 and a winding 4 of the line relay 3. The line relay 3 will also have a biasing winding 5 and an armature having a front contact 6 and a back contact 7. The armature and its front and back contacts are connected in the output circuit 10—11 of a rectifier tube 27. The input circuit of the rectifier tube will be connected by windings 17 and 19 of a transformer to a source of alternating current 20. An additional winding 18 will be provided in this transformer to supply filament current to the rectifier tube. Included in the output circuit of the rectifier will be a filter comprising the condensers 13 and 14 and the inductance 15. Included in the output circuit of the rectifier will be a load such as the telegraph printer magnet 9. This will be connected with a suitable resistance 8 to the front contact 6 of the line relay armature.

In order to keep the load on the rectifier constant, there will be connected to the back contact 7 of the line relay a load equal to that connected to the front contact 6. In other words, the resistance 12 will be equal to the combined resistance of the printer magnet 9 and resistance 8. Under this condition, delivery of current from the rectifier will be constant under all conditions except during travel time of the line relay armature. The time constant of the filter in the output circuit of the rectifier is high enough to hold the current nearly constant during this period.

When the rectifier circuit arrangements of this invention are utilized with a telegraph line relay, the rectifier output current will be sufficiently constant so that the biasing winding 5 may be connected in series in the output circuit. This is accomplished by bridging it around the resistance 16.

In Fig. 2 is shown an arrangement substantially similar to that of Fig. 1 except that the line relay 3 is not operated by currents coming in over a line circuit but is operated locally by current in the rectifier output circuit. Under such conditions, the circuit 31 which includes the line winding 4 of the line relay is bridged around the resistance 21. As this arrangement is substantially similar to that of Fig. 1, no further description thereof will be given.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. The combination of a rectifier, an output circuit therefor, switching means in said output circuit comprising front and back contacts connected in parallel in said output circuit, means connected to one of said contacts to simulate the load connected to the other contact and means for operating said switching means while the current in said output circuit remains constant.

2. The combination of a rectifier, an output circuit therefor, switching means in said output circuit comprising front and back contacts connected in parallel in said output circuit, means connected to one of said contacts to simulate the load connected to the other contact, and a filter having a high time constant in said output circuit.

3. The combination of a rectifier, an output circuit therefor, switching apparatus comprising front and back contacts connected in parallel in said output circuit, means connected to one of said contacts to simulate the load connected to the other contact, and a telegraph circuit comprising a line relay for controlling said switching apparatus.

4. The combination of a rectifier, an output circuit therefor, switching apparatus comprising front and back contacts connected in parallel in said output circuit, means connected to one of said contacts to simulate the load connected to the other contact, a telegraph circuit comprising the winding of a line relay for controlling said switching means, and a biasing winding for said telegraph relay included serially in the output circuit of said rectifier.

5. The combination of a rectifier, an output circuit therefor, a load adapted to be connected in said output circuit, means simulating said load adapted to be connected in said output circuit, switching apparatus for controlling the association of said load and said means with said output circuit, a telegraph circuit including the winding of a line relay for controlling said switching apparatus, and a biasing winding for said telegraph relay included in said output circuit.

In testimony whereof, I have signed my name to this specification this 17th day of April, 1929.

ALLAN WEAVER.